United States Patent [19]
Asano

[11] Patent Number: 5,335,182
[45] Date of Patent: Aug. 2, 1994

[54] EMBROIDERY DATA PRODUCING APPARATUS

[75] Inventor: Fumiaki Asano, Nagoya, Japan

[73] Assignee: Brother Kogyo Kabushiki Kaisha, Nagoya, Japan

[21] Appl. No.: 87,078

[22] Filed: Jul. 7, 1993

[30] Foreign Application Priority Data

Jul. 20, 1992 [JP] Japan .................................. 4-191919

[51] Int. Cl.⁵ .............................................. G06F 15/46
[52] U.S. Cl. .................................. 364/470; 112/103; 112/121.12
[58] Field of Search ............... 364/470; 112/121.12, 112/121.11, 121.13, 103, 266.1, 453, 457

[56] References Cited

U.S. PATENT DOCUMENTS

| | | | |
|---|---|---|---|
| 5,189,622 | 2/1993 | Hayakawa et al. | 364/470 |
| 5,189,623 | 2/1993 | Komuro | 364/470 |
| 5,191,536 | 3/1993 | Komuro et al. | 364/470 |
| 5,227,977 | 7/1993 | Hayakawa et al. | 364/470 |
| 5,231,586 | 7/1993 | Shimizu | 364/470 |

FOREIGN PATENT DOCUMENTS

3-33255 2/1991 Japan .
3-140187 6/1991 Japan .

*Primary Examiner*—Jerry Smith
*Assistant Examiner*—Cameron H. Tousi
*Attorney, Agent, or Firm*—Oliff & Berridge

[57] ABSTRACT

An embroidery data producing apparatus reads outline data of embroidery regions stored in a RAM, and detects a containing-contained relationship between the embroidery regions based on the outline data of the embroidery regions. The embroidery data producing apparatus then determines the shape of the contained-embroidery regions, and automatically determines, based on the determined shapes, whether portions of the embroidery-containing regions containing the contained-embroidery regions should be scooped out or embroidered by overlapping sewing. Accordingly, even when embroidery regions are in a containing-contained relationship, the embroidery data producing apparatus can determine, without depending on the operator, whether the portions of the embroidery-containing regions corresponding to the contained-embroidery regions should be removed from the embroidery-containing region.

20 Claims, 8 Drawing Sheets

| ITEM | INSTRUCTIONS |
|---|---|
| S1 | READ OUTLINE DATA |
| S2 | N ← E NUMBER OF EMBROIDERY REGIONS |
| S3 | C ← 1 |
| S4 | PLACE NUMBER OF EMBROIDERY REGIONS INCLUDED IN CTH EMBROIDERY REGION INTO M |
| S5 | M = 0 ? |
| S6 | P ← 1 |
| S7 | COLOR OF PTH CONTAINED EMBROIDERY REGION GROUND COLOR ? |
| S8 | CALCULATE AREA S OF PTH CONTAINED EMBROIDERY REGION |
| S9 | S > Sf ? |
| S10 | CALCULATE CIRCUMFERENTIAL LENGTH L OF PTH CONTAINED EMBROIDERY REGION |
| S11 | L < Lf ? |
| S12 | PERFORM EMBROIDERY WHEREIN CONTAINED EMBROIDERY REGION IS SCOOPED OUT |
| S13 | PERFORM EMBROIDERY WHEREIN CONTAINED EMBROIDERY REGION IS SEWN UP |
| S14 | P ← P + 1 |
| S15 | P > M ? |
| S16 | C ← C + 1 |
| S17 | C > N ? |
| S18 | PRODUCE STITCH DATA IN ACCORDANCE WITH DETERMINATION |

EMBROIDERY DATA PRODUCING APPARATUS

BACKGROUND OF THE INVENTION

1. Field of the Invention

This invention relates to an embroidery data producing apparatus for producing embroidery data necessary for a sewing machine which embroiders a predetermined figure on a work fabric.

2. Description of Related Art

Conventionally, an embroidery sewing machine which automatically embroiders a pattern onto a work fabric is designed to operate in accordance with embroidery data (stitch data or block data). The embroidery data designates needle positions or the like. An embroidery data producing apparatus for automatically producing embroidery data for such an embroidery sewing machine is disclosed, for example, in Japanese Patent Laid-Open Application Nos. Hei 3-33255 and Hei 3-140187.

The embroidery data producing apparatus comprises, for example, an image scanner, a keyboard, a hard disk drive, a CRT (cathode ray tube) display and the like, all connected to a personal computer. An original pattern for an embroidery figure is read by the image scanner to obtain outline data. The outline data defines profiles of embroidery regions of the embroidery figure. From the outline data, block data comprising a plurality of blocks of square or other suitable shape are generated. The block data are obtained by imaginarily dividing each of the embroidery regions. The block data are also continuous in an embroidery proceeding direction. The so-called one-stitch development then produces stitch data designating needle positions.

Figure 5:
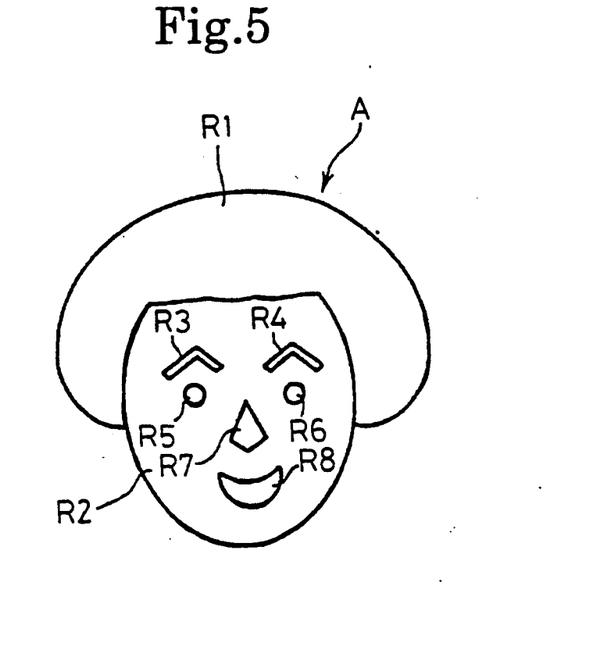
FIG. 5 is a schematic illustration showing an example of an embroidery figure.

Of course, some embroidery figures themselves contain another embroidery region. For example, such an embroidery figure A of the head of a person, as shown in FIG. 5, includes a total of eight embroidery regions, R1 to R8, including an embroidery region R1 for the hair portion, an embroidery region R2 for the face portion, a pair of embroidery regions R3 and R4 for the left and right eyebrow portions, a pair of embroidery regions R5 and R6 for the left and right eye portions, an embroidery region R7 for the nose portion, and an embroidery region R8 for the mouth portion. The embroidery regions R3 to R8 are each contained in the embroidery region R2.

When some embroidery regions themselves contain a further embroidery region in this manner, two embroidery forms are available.

According to the first embroidery form, the entire embroidery region containing the additional embroidery regions, referred to as the embroidery-containing region (in the example of FIG. 5, the embroidery-containing region is embroidery region R2 for the face), is filled with stitches. Then, one of the additional embroidery regions contained within the embroidery-containing region, referred to as the contained-embroidery region (in the example of FIG. 5, the embroidery regions R3 to R8 for the eyes, the nose and so forth), is filled with stitches formed over the stitches forming the embroidery-containing region.

According to the second embroidery form, the embroidery-containing region is filled with stitches except for the one or more contained-embroidery regions. Thus, empty contained-embroidery regions are formed within the embroidery-containing region. Then the contained-embroidery region or regions are filled with stitches.

The conventional embroidery data producing apparatus described above uses the first embroidery form to perform overlapping sewing and to produce block data and stitch data in accordance with the method.

However, the conventional embroidery data producing apparatus, where the procedure for producing the embroidery data is fixed as the first embroidery form method, i.e., performing overlapping sewing for embroidery regions having the containing-contained relationship, has the following drawbacks. In particular, since a embroidery-containing region generally covers a large area, embroidery is created with tatami sewing stitches. Tatami sewing denotes a sewing style wherein a sewing distance is too long to be sewn with a single stitch. Consequently, the stitch is sewn with two or more successive stitches along a straight line. Accordingly, the base fabric often becomes so rigid that, upon subsequent embroidery of a contained-embroidery region, the bobbin thread is pulled out to the embroidered surface. Further, since a plurality of stitch layers overlap, a swell is often produced on the embroidery.

Thus, the method of forming empty contained-embroidery regions in the embroidery-containing region according to the second embroidery form is preferred. With this method, however, a gap often forms between the two embroidery regions, caused by dislocation of stitches or by some other cause. The gap deteriorates the appearance of the embroidery. Accordingly, this method cannot be used unconditionally.

Therefore, conventionally, the operator modifies the automatically produced embroidery data (outline data) by hand to form empty contained-embroidery regions. This practice, however, severely burdens the operator and is an obstacle fully automating embroidery data production.

SUMMARY OF THE INVENTION

This present invention provides an embroidery data producing apparatus capable of discriminating whether a portion of an embroidery-containing region corresponding to a contained-embroidery region should be removed from the embroidery-containing region to automatically produce appropriate embroidery data without involving the operator.

To attain this object, according to this invention, an embroidery data producing apparatus is provided, comprising storage means for storing contour data defining contours of a plurality of embroidery regions, detection means for detecting embroidery regions having a containing-contained relationship based on the stored contour data, discrimination means for determining the shape of the contained-embroidery region contained in the embroidery-containing region detected by said detection means, and determination means for determining whether a portion of the embroidery-containing region containing the contained-embroidery region should be removed from the embroidery-containing region based on the discriminated shape.

In the embroidery data producing apparatus, the detection means detects, based on the stored contour data, a containing-contained relationship between the embroidery regions. Then, the discrimination means determines the shape of the contained-embroidery area, and based on the determined shape, the determination means determines whether a portion of the embroidery-containing region containing the contained-embroidery region should be removed from the embroidery-containing region.

In this case, without any operator interaction, the embroidery data producing apparatus is able to determine whether the portion of the embroidery-containing region containing the contained-embroidery region should be removed from the embroidery-containing region. That is, the embroidery data producing apparatus is able to determine whether the portion containing the contained-embroidery region should not be embroidered or whether the portion containing the contained-embroidery region should be embroidered using overlapping sewing. Accordingly, automatically produced embroidery data can be generated. Since the determination is based on the shape of the contained-embroidery region, appropriate embroidery can be performed in accordance with the shape of the embroidery region.

BRIEF DESCRIPTION OF THE DRAWINGS

A preferred embodiment of the present invention will be described in detail with reference to the following figures, wherein.

DETAILED DESCRIPTION OF THE PREFERRED EMBODIMENT

Figure 9:
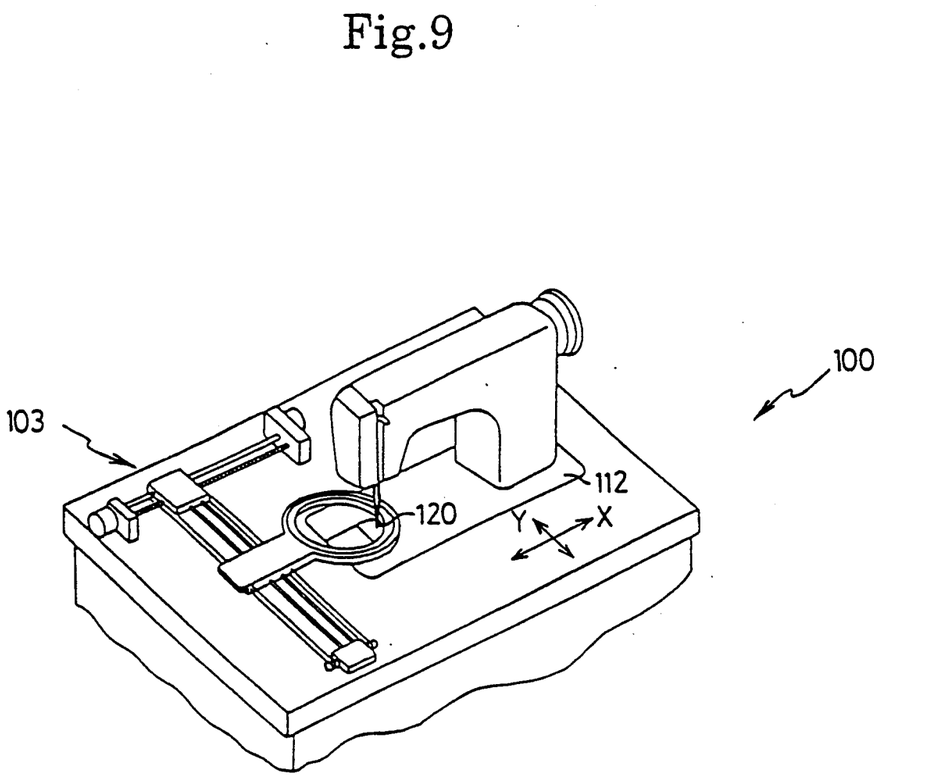
FIG. 9 is a perspective view of an embroidery sewing machine.

FIG. 9 shows an embroidery sewing machine 100 to which an embroidery data producing apparatus according to the present invention can be connected. The embroidery sewing machine 100 has a sewing machine bed 112. The work fabric is placed on the sewing machine bed 112. The sewing machine bed 112 is moved to a predetermined position by a horizontal moving mechanism 103. Each sewing machine 100 has its own peculiar X-Y coordinate system. The sewing machine 100 embroiders the work fabric using a sewing needle 120 and a hook assembly, not shown.

In this instance, the horizontal moving mechanism 103 and the sewing needle 120 are controlled by a control apparatus. Accordingly, when embroidery data indicating amounts of movement of the work fabric in the x and y directions for each stitch is provided to the sewing machine 100, the sewing machine automatically embroiders the work fabric. The embroidery data producing apparatus produces such embroidery data.

The embroidery sewing machine 100 also automatically embroiders the work fabric when the embroidery data are provided as block data. When the embroidery sewing machine 100 has this function, the embroidery data producing apparatus is required to generate the block data. In this case, either the embroidery sewing machine 100 or the embroidery data producing apparatus finally converts the block data to the stitch position data. The stitch position data instructs the embroidery sewing machine where on the work fabric each stitch is to be formed.

Figure 2:
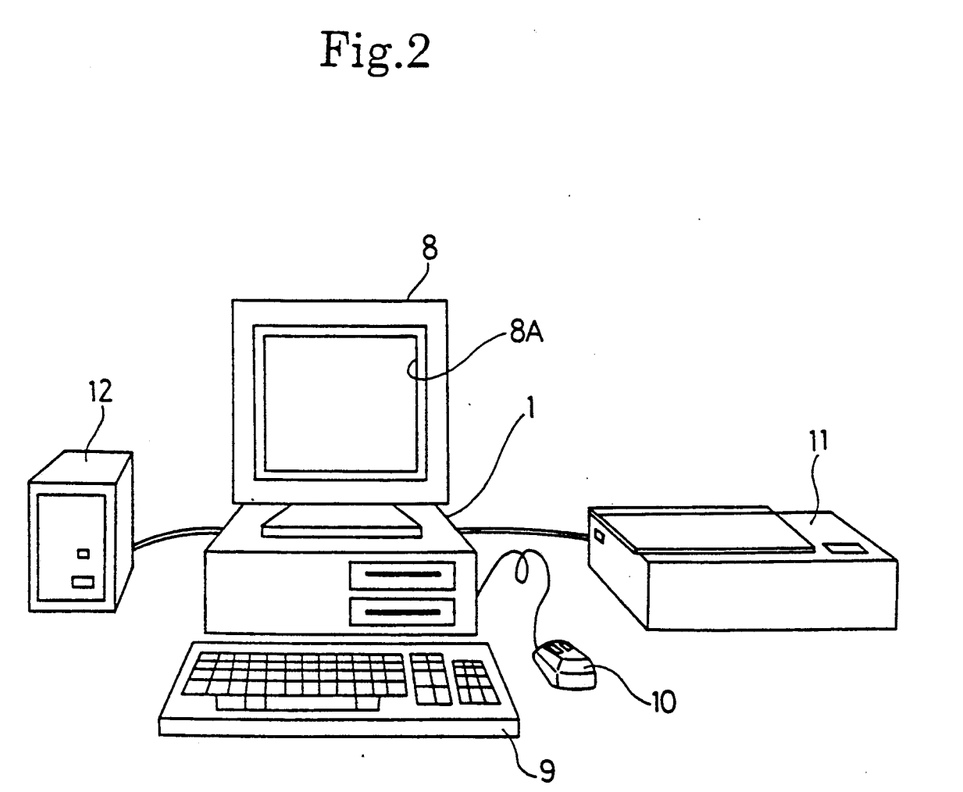
FIG. 2 is a perspective view of an entire embroidery data producing apparatus.
Figure 3:
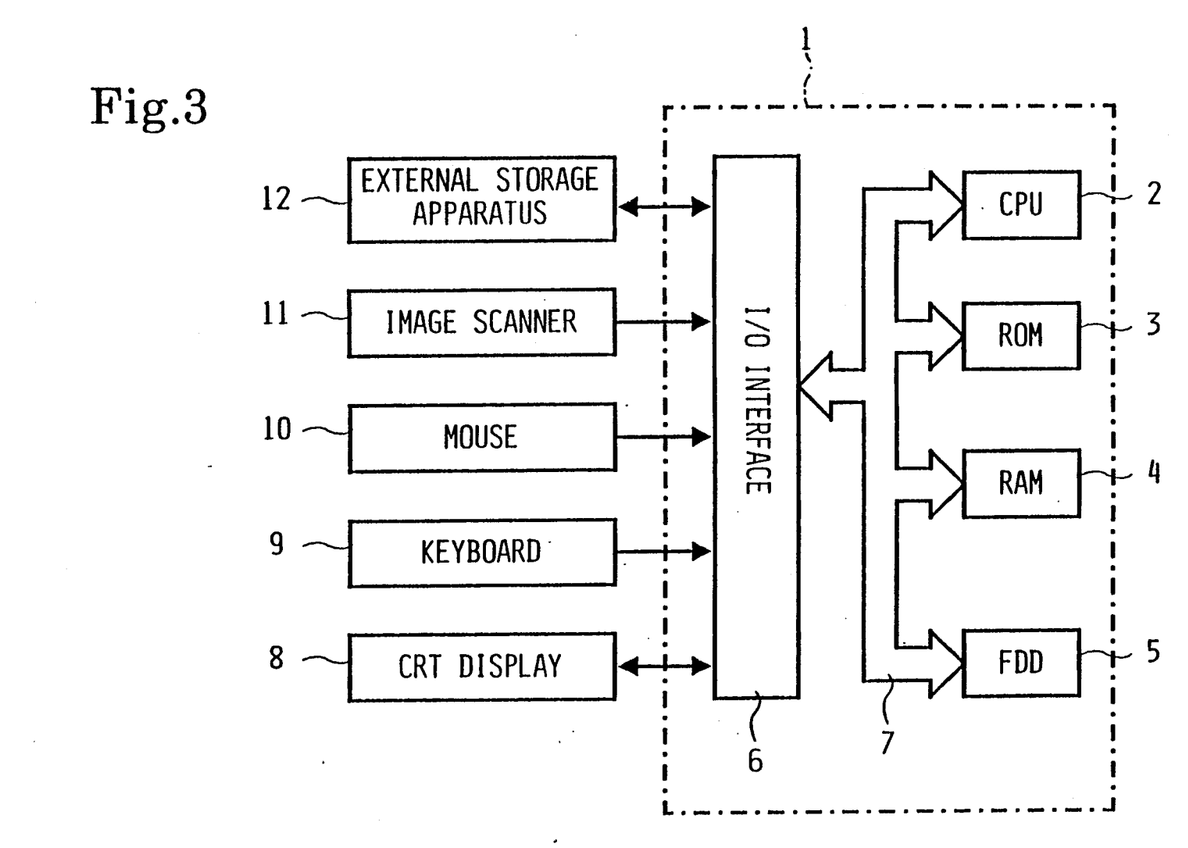
FIG. 3 is a block diagram showing an electric construction of the embroidery data producing apparatus.

An embroidery data producing apparatus 1, as shown in FIGS. 2 and 3, comprises, for example, a general purpose personal computer and includes, as shown in FIG. 3, a CPU (central processing unit) 2, a ROM (read only memory) 3, a RAM (random access memory) 4, a floppy disk driver (FDD) 5 and an input/output interface 6, which are connected to each other by way of a bus 7.

As shown in FIG. 2, a CRT (cathode ray tube) display 8, a keyboard 9, a mouse 10, an image scanner 11 and an external storage apparatus 12 are connected to the embroidery data producing apparatus 1 by the input/output interface 6.

Figure 4:
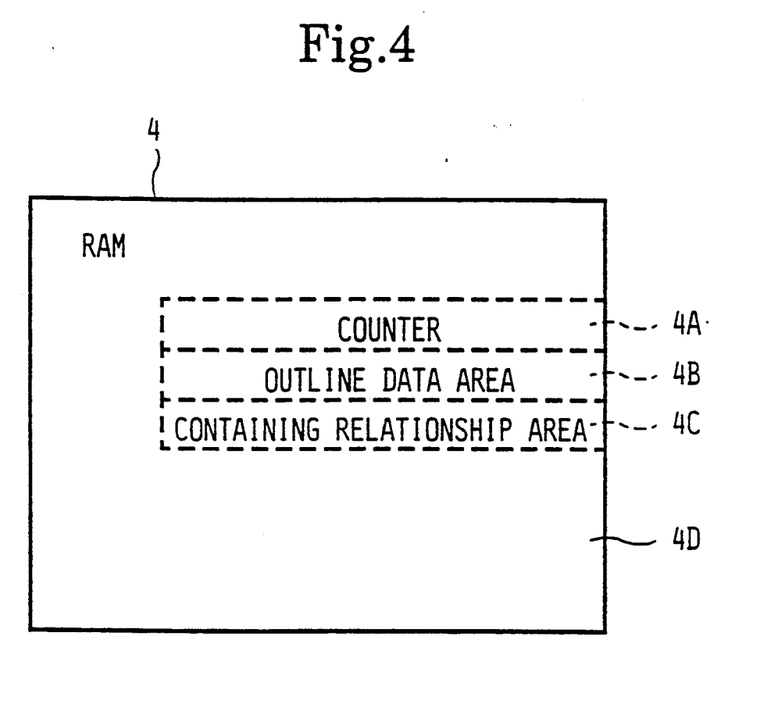
FIG. 4 is a diagrammatic view illustrating stored contents of a RAM.

The CRT display 8 displays an embroidery figure A on a screen 8A. The operator uses the keyboard 9 and the mouse 10 to input various instructions. The operator uses the image scanner 11 to input, for example, image data of an original picture of an embroidery figure A produced by the operator. The external storage apparatus 12 stores one or more files of produced data. The ROM 3 stores programs for operating the embroidery data producing apparatus to generate embroidery data and programs for modifying or editing the embroidery data. The RAM 4 has, as shown in FIG. 4, a counter 4A, an outline data area 4B, a containing relationship area 4C and so forth provided therein together with a working area 4D.

The embroidery data producing apparatus 1 first reads an image of a figure A using the image scanner 11. The embroidery data producing apparatus 1 produces, from the scanned image data, outline data defining the contour of several embroidery regions of the embroidery figure A. Then, the embroidery data producing apparatus 1 divides each embroidery region into a plurality of blocks of rectangular or some other suitable shape in an embroidery proceeding direction. The embroidery data producing apparatus 1 then produces block data indicative of the positions of summits for each of the blocks. Then, embroidery data designating needle position for each stitch as generated from the block data.

The embroidery data producing apparatus 1 detects, after generating the block data from the contour data, a containing-contained relationship between different embroidery regions defined by the outline data. If a containing-contained relationship exists, the embroidery data producing apparatus 1 determines the shape of the contained-embroidery region. The embroidery data producing apparatus 1 then determines, based on the determined shape, whether the portion of the embroidery-containing region containing the contained-embroidery region should be removed from the embroidery-containing region. That is, the embroidery data producing apparatus 1 determines if it should scoop out the portion containing the contained-embroidery region from the embroidery-containing region or whether overlapping sewing embroidery should be performed in the contained-embroidery region.

Accordingly, the embroidery data producing apparatus 1 comprises the detection means, the discrimination means and the determination means. The processing procedure is described in detail with reference to the flow chart of FIGS. 1A and 1B. In operation, the outline data are stored into the outline data area 4B of the RAM 4 or into the external storage apparatus 12. Accordingly, either the RAM 4 or the external storage apparatus 12 comprises the storage means.

The operation of the embroidery data producing apparatus is described with reference to FIGS. 1A and 1B, 5 and 6 using an embroidery figure A of a head of a person, as shown in FIG. 5, as an exemplary figure.

The embroidery figure A comprises a total of eight independent embroidery regions R1 to R8, as described above. Each of the embroidery regions R3 to R8 are individually contained in the embroidery region R2. Outline data of the embroidery figure A comprise a total of eight data sections, corresponding to the embroidery regions R1 to R8. The outline data include aggregations and so forth of coordinate data of a plurality of component points defining the contours (outlines) of the individual embroidery regions R1 to R8.

Figure 1A:
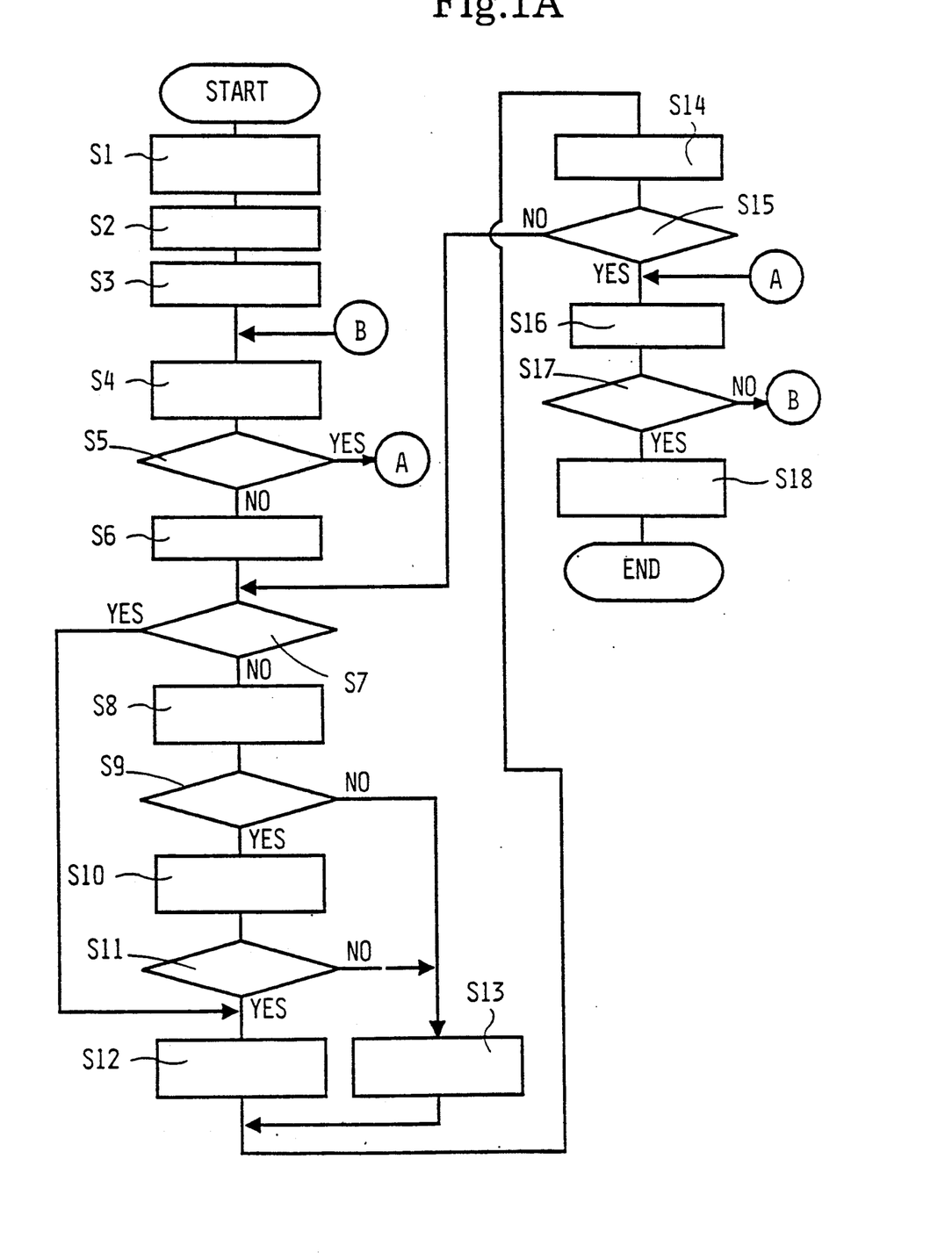
FIGS. 1A and 1B show a flow chart illustrating a processing procedure for producing stitch data from outline data.
Figure 1B:
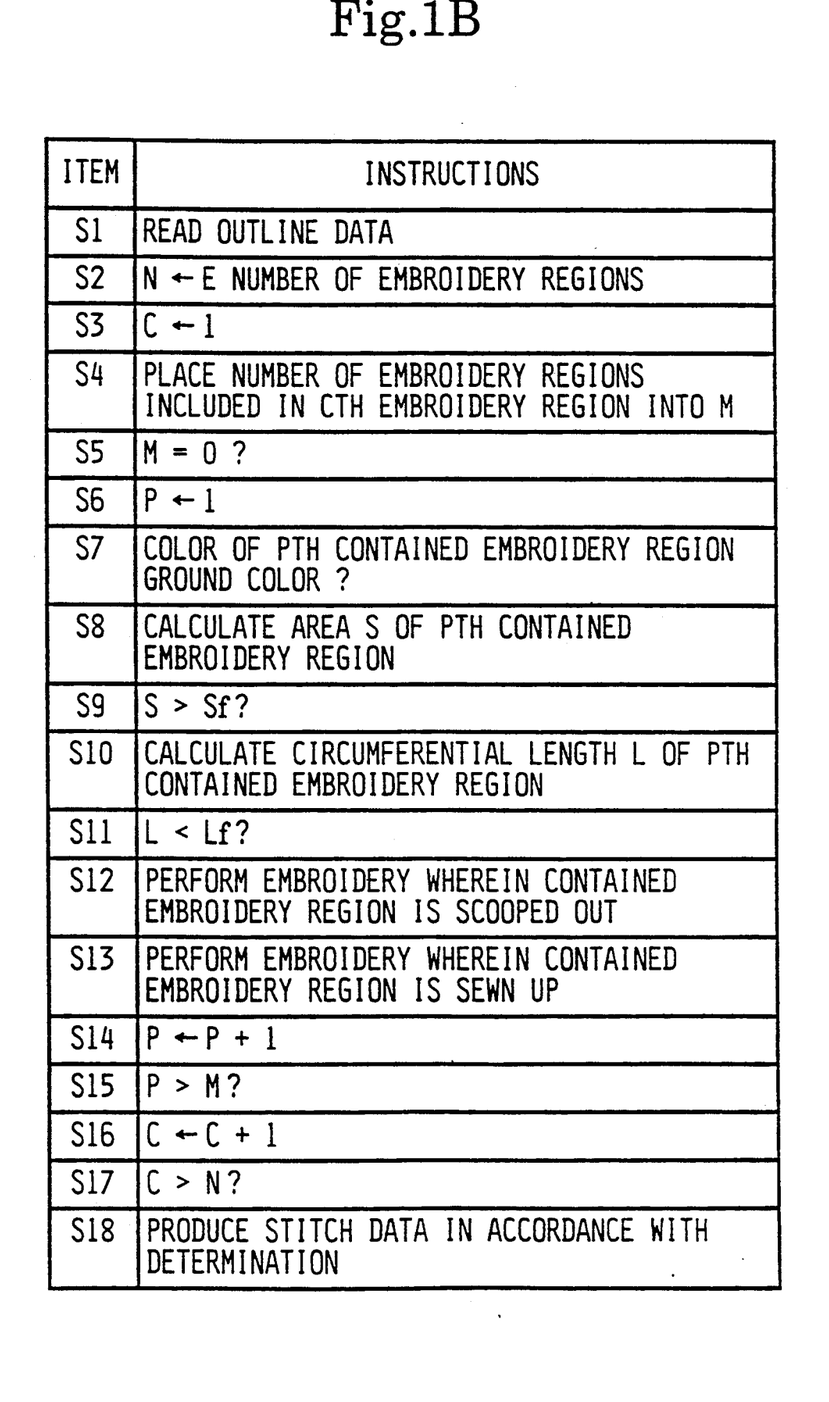

The CPU 2 processes the procedure illustrated in the flow chart of FIGS. 1A and 1B to produce stitch data from the outline data.

First, the embroidery data producing apparatus 1 reads in outline data for the embroidery figure A (step S1). The operator operates the image scanner 11 to input the embroidery figure A into the embroidery data producing apparatus 1. The outline data are stored into the outline data area 4B of the RAM 4 by the CPU 2. Then, the CPU 2 determines the number of embroidery regions from the outline data stored in the outline data area 4B and stores the determined number of embroidery regions as a variable N into the working area 4D of the RAM 4 (S2). In the embroidery figure A of FIG. 5, N=8.

Subsequently, the CPU 2 stores "1" as the counter value C into the counter 4A of the RAM 4 (S3). The CPU 2 then determines whether the Cth embroidery region contains one or more embroidery region. The CPU then stores the determined number of contained-embroidery regions contained in the Cth embroidery region as the number M into the containing relationship area 4C of the RAM 4 (S4). The containing-contained relationship is detected by comparing coordinate values of component points of the relevant embroidery regions.

Since the first embroidery region R1 of the embroidery figure A shown in FIG. 5, contains zero contained-embroidery regions, the value of the variable M is 0. Then, the CPU 2 determines whether the value of the variable M is equal to 0 (S5). If the CPU 2 determines that the value of the variable M is equal to 0 (S5: Yes), then the CPU next executes step S16. In Step S16, the CPU 2 increments the counter value C stored in the counter 4A of the RAM 4 by one. The CPU 2 then compares the new value of the counter value C with the variable N stored in the working area 4D of the RAM 4 (S17). If the CPU 2 determines that the value of the counter value C is less than or equal to N (S17: No), the CPU 2 returns to step S4. Since the embroidery region R2 (the embroidery-containing region) of the embroidery figure A contains the six embroidery regions R3 to R8 as contained-embroidery regions, the CPU 2 places 6 into the containing relationship area 4C of the RAM 4 as M (S4). The CPU 2 then determines whether the value of M is equal to zero (S5). Since M=6, the CPU 2 determines that the value of M is not equal to zero (S5: No), and continues to step S6.

The CPU 2 determines whether portions of the embroidery-containing region R2 containing the contained-embroidery regions R3 to R8 should be removed from the embroidery-containing region R2 in steps S6 to S15. The CPU 2 determines the shapes of the contained-embroidery regions R3 to R8 to determine if portions of the embroidery-containing region R2 corresponding to the contained-embroidery regions R3-R8 should be removed. In the present embodiment, the CPU 2 determines the shapes of the embroidery regions R3-R8 by determining the areas S and the circumferential lengths L of the contained-embroidery regions R3 to R8 and comparing the determined areas S and circumferential lengths L with respective preset values.

First, the CPU 2 sets a counter value P to 1 in the counter 4A, to count the number of analyzed contained-embroidery regions (S6). Then, the CPU 2 determines whether the color of the Pth contained-embroidery region is the ground color (i.e., the color of the work fabric on which the embroidery Figure A is formed) (S7). If the CPU 2 determines that the color of the Pth contained-embroidery region is the ground color (S7: Yes), then no embroidery is necessary to form the Pth contained-embroidery region. Therefore, the CPU 2 determines that the portion of the embroidery-containing region (in this instance, the containing embroidery region R2) corresponding to the Pth contained-embroidery region is scooped out (S12).

If the CPU 2 determines that the color of the Pth contained-embroidery region is not the ground color (S7: No), the CPU 2 determines the area S of the Pth contained-embroidery region (S8). The CPU 2 next determines whether the area S of the Pth contained-embroidery region is greater than a preset predetermined value Sf (S9). If the CPU 2 determines that the area value S is equal or less than a predetermined area value Sf (S9:No), the CPU 2 determines that the Pth contained-embroidery region is sewn up. In particular, since the Pth contained-embroidery region is first embroidered as the Cth embroidery-containing region and then embroidered as the Pth contained-embroidery region, overlapping sewing is used.

In the embroidery region A of FIG. 5, the areas of the embroidery regions R5 and R6 are lower than the predetermined value Sf. If the area S of a contained-embroidery region is lower than the predetermined value Sf, then the portion does not require scooping out of the corresponding portion of the embroidery-containing region, especially since scooping out the corresponding portion is likely to cause stitch dislocation upon embroidering the embroidery regions R5 and R6.

However, if the area value S of the Pth contained-embroidery region is greater than the preset value Sf (S9: Yes), then the CPU 2 determines the circumferential length L of the Pth contained-embroidery region (S10). The CPU 2 next determines whether the circumferential length L is less than a preset predetermined value Lf (S11). If the CPU 2 determines that the circumferential length L is less than the preset value Lf (S11: Yes), then the CPU 2 determines that the Pth contained-embroidery region has a large area and a nearly circular shape. In this instance, the CPU 2 determines that the portion of the containing embroidery region (in this instance, the containing embroidery region R2) corresponding to the Pth contained-embroidery region is scooped out (S12).

The predetermined values Sf and Lf are preferably in the range of 0.06 cm$^2$ to 0.6 cm$^2$ and 1.0 cm to 3.0 cm, respectively. Preferably, for the example embroidery pattern shown in FIG. 5, $Sf=0.25$ cm² and $Lf=2.0$ cm. These values were experimentally determined for the embroidery pattern shown in FIG. 5. Therefore, these exact values of $Sf$ and $Lf$ are illustrative and are not limiting of the range of values for $Sf$ and $Lf$.

In the embroidery figure A shown in FIG. 5, the embroidery regions R7 and R8 fall under this case. When the portion of the containing embroidery region R2 corresponding to the contained-embroidery regions R7 and R8 is sewn up the ground fabric becomes rigid. Thus, upon the embroidery of the contained-embroidery regions R7 and R8, the bobbin thread is often pulled out to the embroidery surface. Additionally, the embroidery swells unnecessarily, deteriorating the appearance of the embroidery.

However, if the CPU 2 determines that the circumferential length L is greater than or equal to the preset value Lf (S11: No), the CPU 2 determines that the Pth contained-embroidery region has a large area but a comparatively elongated shape. In this case, as in the small area case, the CPU 2 determines that the Pth contained-embroidery region is embroidered using overlap sewing (S13). In the embroidery figure A, the embroidery regions R3 and R4 fall under this case.

After determining whether the portion of the Cth embroidery-containing region corresponding to the Pth contained-embroidery region is to be scooped out or sewn up, the CPU 2 increments the counter value P stored in the counter 4A of the RAM 4 by one (S14). Then, the CPU 2 determines whether all of the contained-embroidery regions contained in the current embroidery-containing region have been analyzed. In particular, the CPU 2 compares the new value of P stored in the counter 4A with the value of M stored in the containing relationship area 4C of the RAM 4 (S15). If the CPU 2 determines that the value P is not greater than the value of M (S15: No), then the CPU 2 returns to S7.

However, if the CPU 2 determines that the value of P is greater than the value of M (S15: Yes), the CPU 2 continues to step S16, where it increments the counter value C stored in the counter 4A of the RAM 4 by one (S16), and then compares the new value of the counter value C with the variable N stored in the working area 4D of the RAM 4 (S17). If the CPU 2 determines that the value C is not greater than the value N (S17: No), then the CPU 2 again returns to step S4.

However, if the CPU 2 determines that the value of C is greater than the value N, indicating that the CPU 2 has completed the detection of the containing-contained relationships and the determination of scooping out or sewing up for all of the embroidery areas (S17: Yes), the CPU 2 continues to step S18. In step S18, the CPU 2 generates the stitch data, based on the detected containing-contained relationships and the determined scooping out or sewing up of the portions of the embroidery-containing regions corresponding to the relevant contained-embroidery regions.

Figure 6:
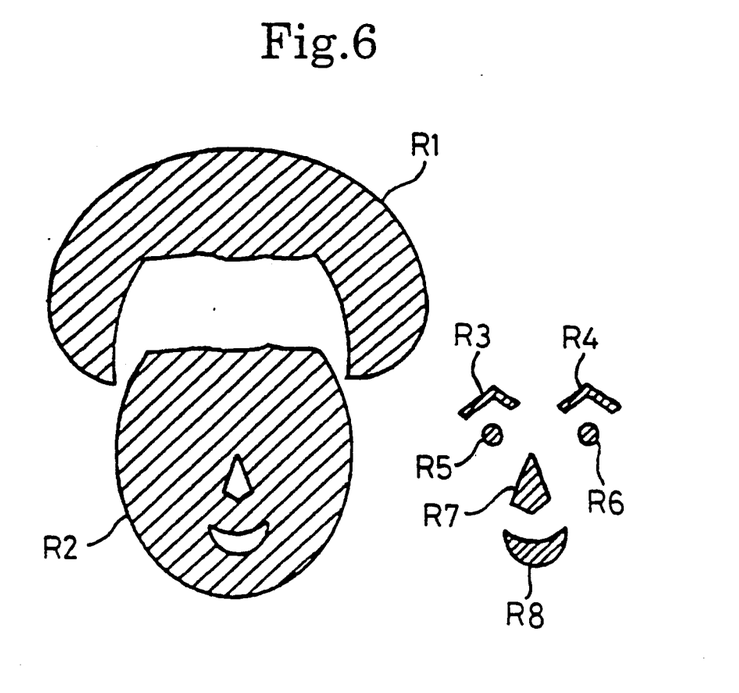
FIG. 6 is a schematic view illustrating a manner of forming embroideries for individual divisional embroidery regions.

FIG. 6 illustrates how the embroidery figure A is embroidered, based on the stitch data produced in the manner described above. In FIG. 6, the stitched portions are indicated by slanting lines. As can be seen from FIG. 6, the portions of the embroidery region R2 containing the embroidery regions R3 to R6 are stitched. Accordingly, the embroidery regions R3 to R6 are sewn in an overlapping relationship on the embroidery region R2. Further, the portions of the embroidery region R2 containing the embroidery regions R7 and R8 are removed from the embroidery region R2, and scooping out embroidery is performed for those portions. Since the portions of the embroidery regions R7 and R8 are scooped out, embroidery is performed for the embroidery region R2 without performing overlapping sewing on these regions. Further, if the boundaries of the scooped-out portions of the embroidery region R2 are a little smaller than the boundaries of the embroidery regions R7 and R8, then gaps between the region R2 and the regions R7 and R8, caused by dislocation of stitches, can be prevented with certainty.

In this manner, according to the invention, a containing-contained relationship of the embroidery regions is detected based on the outline data. Based on the contours of the contained-embroidery regions, it is automatically determined whether corresponding portions of the embroidery-containing region containing the contained-embroidery regions should be scooped out or whether embroidery based on overlapping sewing should be performed for the contained-embroidery regions. Stitch data are then produced based on these determinations.

Accordingly, in contrast to the conventional embroidery data producing apparatus, wherein data modification must be performed by the operator, since the stitch data are automatically produced in accordance with a fixed algorithm where overlapping sewing is always performed, the embroidery producing apparatus of this invention can determine, without depending upon the operator, whether portions of a embroidery-containing region corresponding to contained-embroidery regions should be removed from the containing embroidery region. Accordingly, automatic production of embroidery data can be promoted sufficiently. Further, since the determination is performed based on the contours of the contained-embroidery regions, appropriate embroidery in accordance with the contours of the embroidery regions can be performed.

This invention is not limited to the embodiment described in detail above, but various alterations and modifications can be made without departing from the spirit and scope of this invention.

Figure 7:
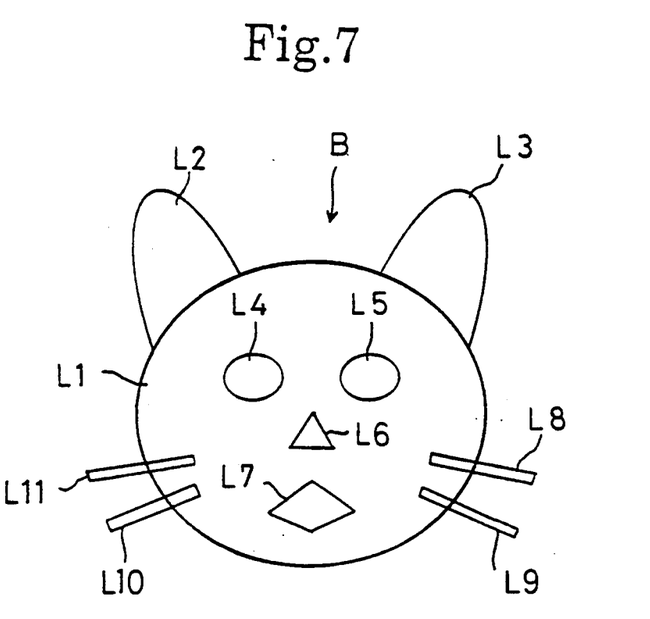
FIG. 7 is a schematic illustration showing another example of an embroidery figure.

A full containing relationship, wherein an embroidery region is fully surrounded by another embroidery region, is described in the embodiment described above. However, the scope of this invention includes the case of an embroidery region being only partially surrounded by another embroidery region as in embroidery regions L8 to L11 shown in FIGS. 7 and 8. The embroidery figure B shown in FIG. 7 comprises a total of eleven embroidery regions L1 to L11, including an embroidery region L1 of the face portion, a pair of embroidery regions L2 and L3 of the ear portions, a pair of embroidery regions L4 and L5 of the left and right eye portions, an embroidery region L6 of the nose portion, an embroidery region L7 of the mouth portion, and two pairs of embroidery regions L8 to L11 of the left and right whisker portions. The embroidery regions L4 to L7 are fully contained in the embroidery region L1.

Figure 8:
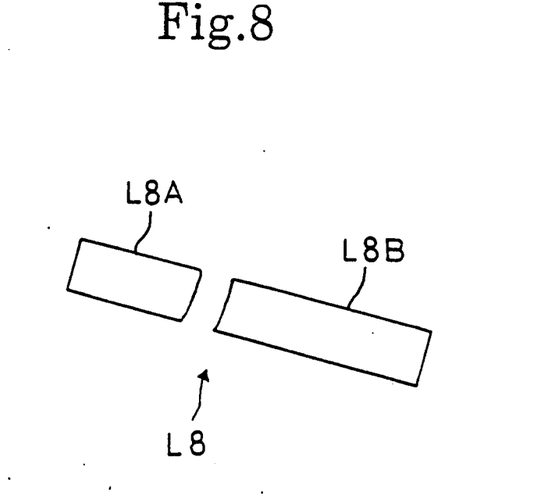
FIG. 8 is an enlarged view of part of the embroidery figure shown in FIG. 7.

However, the embroidery regions L8 to L11 are only partially contained in the embroidery region L1. The outline data of the embroidery figure B include a total of eleven data sections for the embroidery regions L1 to L11 and comprises aggregations and so forth of coordinate data of a plurality of component points forming the contours (outlines) of the individual embroidery regions L1 to L11. In this instance, the embroidery region L8 is divided along a boundary portion into two regions L8A and L8B, as shown in FIG. 8. Each divided region L8A and L8B is then processed in a manner similar to the embodiment described above.

Further, while, in the embodiment described above, the determination of scooping out or overlapping sewing is performed based on the area and the circumferential length of a contained-embroidery region, the discrimination of a contained-embroidery region may be based only on the area or alternatively on a width of the contained-embroidery region.

What is claimed is:

1. An embroidery data producing apparatus, comprising:

storage means for storing contour data defining contours of a plurality of embroidery regions;

detection means for detecting ones of the plurality of embroidery regions which contain other ones of the plurality of embroidery regions, based on the contour data of the embroidery regions stored in the storage means;

discrimination means for determining shapes of the contained ones of the plurality of embroidery regions contained in the containing ones of the plurality of embroidery regions detected by said detection means; and determining means for determining, based on the determined shapes of the contained ones of the plurality of embroidery regions, whether portions of the containing ones of the plurality of embroidery regions corresponding to the contained ones of the plurality of embroidery regions should be removed from the containing ones of the plurality of embroidery regions.

2. The embroidery data producing apparatus of claim 1, wherein said determining means determines for each corresponding portion, if the corresponding portion should be removed, based on at least one of an area of the corresponding contained-embroidery region and a circumference of the corresponding contained-embroidery region.

3. The embroidery data producing apparatus of claim 2, wherein said determining means determines that the corresponding region is to be embroidered when the area of the corresponding contained-embroidery region is less than or equal to a predetermined area value.

4. The embroidery data producing apparatus of claim 2, wherein said determining means determines that the corresponding region is to be removed when the area of the corresponding contained-embroidery region is greater than a predetermined area value and the circumference of the corresponding contained-embroidery region is greater than a predetermined area value and the circumference of the corresponding contained-embroidery region is less than a predetermined circumference value.

5. The embroidery data producing apparatus of claim 2, wherein said determining means determines that the corresponding region is embroidered when the area of the corresponding contained-embroidery region is greater than a predetermined area value and the circumference of the corresponding contained-embroidery region is greater than or equal to a predetermined circumference value.

6. The embroidery data producing apparatus of claim 2, wherein determining means determines if the corresponding portion should be removed based on a predetermined area value Sf and a predetermined circumference value Lf, the predetermined area value Sf and the predetermined circumference value Lf being in the range of 0.06 cm$^2$ to 0.6 cm$^2$ and 1.0 cm to 3.0 cm, respectively.

7. The embroidery data producing apparatus of claim 6, wherein Sf=25 cm$^2$ and Lf=2.00 cm.

8. An embroidery data producing apparatus, comprising:

storage means for storing contour data, the contour data defining a plurality of embroidery regions;

detection means for detecting, for each one of the plurality of embroidery regions, whether at least one other embroidery region of the plurality of embroidery regions is at least partially contained within the embroidery-containing region of the plurality of embroidery regions;

discrimination means for determining, for each detected embroidery-containing region, a shape for each at least one detected contained-embroidery region;

determining means for determining whether, for each detected embroidery-containing region and each detected contained-embroidery region, a portion corresponding to one of the at least one detected contained-embroidery region should be removed from the detected embroidery-containing region, based on the determined shape of the corresponding detected contained-embroidery region; and embroidery data generating means for generating embroidery data based on the stored contour data and the removed portions of the embroidery-containing regions.

9. The embroidery data producing apparatus of claim 8, wherein said determining means determines for each corresponding portion, if the corresponding portion should be removed, based on at least one of an area of the corresponding contained-embroidery region and a circumference of the corresponding contained-embroidery region.

10. The embroidery data producing apparatus of claim 9, wherein said determining means determines that the corresponding region is to be embroidered when the area of the corresponding contained-embroidery region is less than or equal to a predetermined area value.

11. The embroidery data producing apparatus of claim 9, wherein said determining means determines that the corresponding region is to be removed when the area of the corresponding contained-embroidery region is greater than a predetermined area value and the circumference of the corresponding contained-embroidery region is less than a predetermined circumference value.

12. The embroidery data producing apparatus of claim 9, wherein said determining means determines that the corresponding region is embroidered when the area of the corresponding contained-embroidery region is greater than a predetermined area value and the circumference of the corresponding contained-embroidery region is greater than or equal to a predetermined circumference value.

13. The embroidery data producing apparatus of claim 9, wherein determining means determines if the corresponding portion should be removed based on a predetermined area value Sf and a predetermined circumference value Lf, the predetermined area value Sf and the predetermined circumference value Lf being in the range of 0.06 cm² to 0.6 cm² and 1.0 cm to 3.0 cm, respectively.

14. The embroidery data producing apparatus of claim 13, wherein Sf=0.25 cm² and Lf=2.00 cm.

15. A method for generating embroidery data from contour data defining a plurality of embroidery regions comprising the steps of:

determining, for each one of the plurality of embroidery regions, whether at least one other embroidery region of the plurality of embroidery regions is contained within the one of the plurality of embroidery regions;

determining, for each one of the plurality of embroidery regions containing other ones of the plurality of embroidery regions, shapes of the contained-embroidery regions;

determining, based on the determined shape for each contained-embroidery region, whether a corresponding portion of the corresponding embroidery-containing region should be removed from the corresponding embroidery-containing region; and generating embroidery data from the contour data and the removed portions of the embroidery-containing regions.

16. The method of claim 15, wherein the removal determining step comprises the steps of:

determining an area of the contained-embroidery region;

comparing the determined area to a predetermined area value; and embroidering the corresponding portion of the embroidery-containing region if the determined area is less than or equal to the predetermined area value.

17. The method of claim 16, wherein, when the determined area is greater than the predetermined area value, the removal determining step further comprises the steps of determining a circumference of the contained-embroidery region;

comparing the determined circumference to a predetermined circumference value; and removing the corresponding portion of the embroidery-containing region if the determined circumference is less than the predetermined circumference value.

18. The method of claim 17, wherein the predetermined area value, Sf, and the predetermined circumference value, Lf, are in the range of 0.06 cm² to 0.6 cm² and 1.0 cm to 3.0 cm, respectively.

19. The method of claim 18, wherein Sf=0.25 cm² and Lf=2.00 cm.

20. The method of claim 16, wherein, when the determined area is greater than the predetermined area value, the removal determining step further comprises the steps of:

determining a circumference of the contained-embroidery region;

comparing the determined circumference to a predetermined circumference value; and embroidering the corresponding portion of the embroidery-containing if the determined circumference is greater than or equal to the predetermined circumference value.

* * * * *